US008140578B2

(12) United States Patent
Johnson et al.

(10) Patent No.: US 8,140,578 B2
(45) Date of Patent: Mar. 20, 2012

(54) MULTILEVEL HIERARCHICAL ASSOCIATIONS BETWEEN ENTITIES IN A KNOWLEDGE SYSTEM

(75) Inventors: Sandra K. Johnson, Cary, NC (US); Grant Douglas Miller, Superior, CO (US); Joan LaVerne Mitchell, Longmont, CO (US); David Ward, Broomfield, CO (US)

(73) Assignee: International Business Machines Corporation, Armonk, NY (US)

( * ) Notice: Subject to any disclaimer, the term of this patent is extended or adjusted under 35 U.S.C. 154(b) by 537 days.

(21) Appl. No.: 12/173,689

(22) Filed: Jul. 15, 2008

(65) Prior Publication Data
US 2010/0017427 A1    Jan. 21, 2010

(51) Int. Cl.
G06F 17/30    (2006.01)
(52) U.S. Cl. .................... 707/791; 707/802; 717/124
(58) Field of Classification Search .................. None
See application file for complete search history.

(56) References Cited

U.S. PATENT DOCUMENTS

| 6,314,420 | B1 | 11/2001 | Lang et al. |
| 6,847,974 | B2 * | 1/2005 | Wachtel ........................ 717/143 |
| 6,915,294 | B1 | 7/2005 | Singh et al. |
| 7,039,864 | B1 | 5/2006 | Piersol et al. |
| 7,051,036 | B2 | 5/2006 | Rosnow et al. |
| 7,065,536 | B2 | 6/2006 | Bachman et al. |
| 7,216,121 | B2 | 5/2007 | Bachman et al. |
| 7,395,277 | B2 | 7/2008 | Miller et al. |
| 7,533,105 | B2 | 5/2009 | Mitchell et al. |
| 7,533,305 | B2 | 5/2009 | Behdjati et al. |
| 7,900,201 | B1 * | 3/2011 | Qureshi et al. .............. 717/174 |
| 7,945,598 | B2 | 5/2011 | Johnson et al. |
| 8,001,100 | B2 | 8/2011 | Chilukuri et al. |
| 2003/0058277 | A1 | 3/2003 | Bowman-Amuah |
| 2004/0103181 | A1 | 5/2004 | Chambliss et al. |
| 2005/0278362 | A1 | 12/2005 | Maren et al. |
| 2006/0015479 | A1 | 1/2006 | Wood et al. |
| 2006/0074891 | A1 | 4/2006 | chandrasekar et al. |
| 2006/0122812 | A1 | 6/2006 | Tinseth |
| 2006/0167890 | A1 | 7/2006 | Miller et al. |
| 2007/0112781 | A1 | 5/2007 | McMullen et al. |
| 2008/0275858 | A1 | 11/2008 | Day et al. |

(Continued)

OTHER PUBLICATIONS

Howarth et al., "Visualizing Search Results from Metadata-enabled Repositories in Cultural Domains", Charting the Topic Maps Research and Applications Landscape, 1st International Workshop, Leipzig, Oct. 6-7, 2005, TMRA 2005 Revised Selected Papers (published 2006) pp. 263-270.

(Continued)

*Primary Examiner* — Hung Q Pham
(74) *Attorney, Agent, or Firm* — Yee & Associates, P.C.; Steven L. Bennett (57) ABSTRACT

A computer implemented method, data processing system, and computer program product for managing multilevel hierarchical structured information in disparate knowledge repositories. An association data structure is created for an entity as metadata in a metadata repository. The association data structure is populated with association information about the entity. A process data structure is created for the entity as metadata in the metadata repository. The process data structure is populated with process information about the entity. Information about a multi-phased process is then collected by extracting process information from each entity of the multi-phased process across the disparate knowledge repositories. The collected information comprising information about the multi-phased process is then stored in the process data structure in the metadata repository.

18 Claims, 7 Drawing Sheets

U.S. PATENT DOCUMENTS

2009/0248688 A1    10/2009    Kim et al.
2009/0293060 A1    11/2009    Guevorkian et al.
2010/0017427 A1     1/2010    Johnson et al.

OTHER PUBLICATIONS

Aridor et al., "Knowledge Encapsulation for Focused Search from Pervasive Devices", ACM, WWW10 May 1-5, 2001, Hong Kong, pp. 754-763.

Berger et al., "An Adaptive Information Retrieval System based on Associative Networks", 2004 Australian Computer Society Inc., Proceedings of First Asia-Pacific Conference on Conceptual Modelling, Dunedin, New Zealand. pp. 1-10.

Pasca, "Acquisition of Categorized named Entities for Web Search", CIKM'04, Nov. 2004, Washington DC, ACM 2004, pp. 137-145.

Stojanovic, "On the Role of a User's Knowledge Gap in an Information Retrieval Process", K-CAP'05, Oct. 2005, Banff, Alberta, Canada, ACM 2005, pp. 83-90.

Moody, "The Stars Process Engine: Language and Architecture to Support Process Capture and Multi-User Execution", Baltimore, MD, 1994, pp. 4-15.

Rus et al., "Customizing Information Capture and Access", ACM Transactions on Information Systems, vol. 15, No. 1, Jan. 1997, pp. 67-101.

U.S. Appl. No. 12/259,680, filed Oct. 28, 2008, Johnson et al.

USPTO office action for U.S. Appl. No. 12/173,668 dated Nov. 12, 2010.

USPTO Notice of allowance for U.S. Appl. No. 12/259,680 dated Jan. 10, 2011.

Pautasso et al., "The JOpera visual composition language", Journal of Visual Languages and Computing, vol. 15, Issues 1-2, Feb.-Apr. 2005, pp. 119-152.

Fileto et al., "POESIA: An ontological workflow approach for composing Web services in agriculture", The VLDB Journal, vol. 12, Issue 4, Nov. 2003, pp. 352-367.

Pautassi et al, "JOpera: a Toolkit for Efficient Visual Composition of Web Services", International Journal of Electronic Commerce, vol. 9, No. 2, Winter 2004/2005, pp. 107-141.

Ceglar et al., "Visualising hierarchical associations", Knowledge and Information Systems, vol. 8, Springer-Verlag, London, UK, Sep. 30, 2004, pp. 247-275.

USPTO Notice of allowance dated Apr. 12, 2011 regarding U.S. Appl. No. 12/173,668.

\* cited by examiner

MULTILEVEL HIERARCHICAL ASSOCIATIONS BETWEEN ENTITIES IN A KNOWLEDGE SYSTEM

CROSS REFERENCE TO RELATED APPLICATIONS

The present invention is related to the following application entitled "LEVERAGING MULTILEVEL HIERARCHICAL ASSOCIATIONS TO FIND CROSS-BOUNDARY ISSUES", Ser. No. 12/173,668, filed on Jul. 15, 2008, status co-pending. The related application is assigned to the same assignee and is incorporated herein by reference.

BACKGROUND OF THE INVENTION

1. Field of the Invention

Embodiments of the present invention relate generally to an improved data processing system, and in particular to a computer implemented method, data processing system, and computer program product for capturing, accessing, and leveraging federated information in a knowledge system.

2. Description of the Related Art

In knowledge-based environments, the availability and leveraging of information, coupled with associated human expertise, is a critical component for improved process, implementation, and utilization efficiencies. A knowledge base provides a plethora of information about a specific subject matter in multiple data sources that can be accessed from global locations with Internet access, or other relevant technologies. Given this vast knowledge base, however, finding and accessing specific or associated information about a given subject matter may be prohibitively challenging. In addition, accessing, leveraging, and analyzing information in these disparate repositories in a collaborative manner can illuminate root causes of issues that otherwise may not be apparent.

Targeted information in a knowledge base may be associated with horizontal or multilevel hierarchical structures. For example, targeted information comprising an information technology (IT) solution may consist of several components, including products, service components, solution building blocks (SBBs), or other entities. In this example, the solution information can be viewed as a hierarchical knowledge-based structure. The information includes specifics about the solution (e.g., list of products, services, and SBBs that compose the solution, including specific versions and fix pack information, integration test scripts, etc.). In addition, separate information exists for each component of the solution (e.g., product test script, product owner, life cycle, etc.). As a result, there are many potential linkages among the different components to create the IT solution with its associated knowledge base. This multilevel hierarchical structure introduces additional level(s) of complexity, relative to linear or horizontal knowledge-based systems. In fact, this multilevel hierarchical structure can be layered on top of a linear or horizontal structure to more efficiently address this additional level of complexity.

BRIEF SUMMARY OF THE INVENTION

The illustrative embodiments provide a computer implemented method, data processing system, and computer program product for capturing, accessing, and leveraging federated information. In today's computing environment, complex network data processing systems often are needed to facilitate work in large corporations. These complex networks may even span across regions in various worldwide locations, as well as use the Internet as part of a virtual private network for conducting business. In many instances, a federated knowledge-based system is employed to allow enterprise components to share and access information throughout the network. With the federated knowledge-based system, wherein multiple data sources appear as one to users, data resides and is controlled locally, and client users in the system, regardless of location, may access the data across multiple disparate repositories using a directory service.

There are many instances where it is necessary to understand and traverse the multilevel hierarchy of a federated knowledge-based system. For example, using the IT solution scenario described previously, if a problem arises with a deployed IT solution, there may be a situation where a software bug is found in a product. In addition to the product being a stand-alone software product, the product may be present as a component in many different solutions. As a result, there is a need to find all of the solutions that contain this specific version of the product that is deployed in IT environments worldwide, potentially applying the fix automatically. Furthermore, areas with broad functions and capabilities, such as security, are present in many different product offerings. Therefore, the support structure associated with these areas is vast and may be too complex to render in a two-level hierarchy. A multilevel structure is more appropriate. Another example of similar complexity is the multiple versions of product offerings that could potentially compose a solution. The support structure associated with the various permutations of the product releases, all of which could result in different solution instantiations, may also be rendered in a multilevel knowledge-based infrastructure. This facilitates a more flexible mechanism for representing more complex relationships and associations, relative to the horizontal approach.

The illustrative embodiments provide a structure for storing and linking multilevel hierarchical structured information that may be in federated repositories worldwide. The structure includes associations between various levels of the hierarchy in the form of metadata to represent relationships between the knowledge contained in these federated repositories. The structure also includes the processes used to store information regarding tasks comprising a solution that may span multiple disparate knowledge systems. In addition, the illustrative embodiments provide a methodology for accessing and extracting this structured information, from the top down or bottom up, to facilitate notifications of all instantiated copies of the information.

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process, such that the instructions which execute on the computer or other programmable apparatus provide processes for implementing the functions/acts specified in the flowchart and/or block diagram block or blocks.

Figure 1:
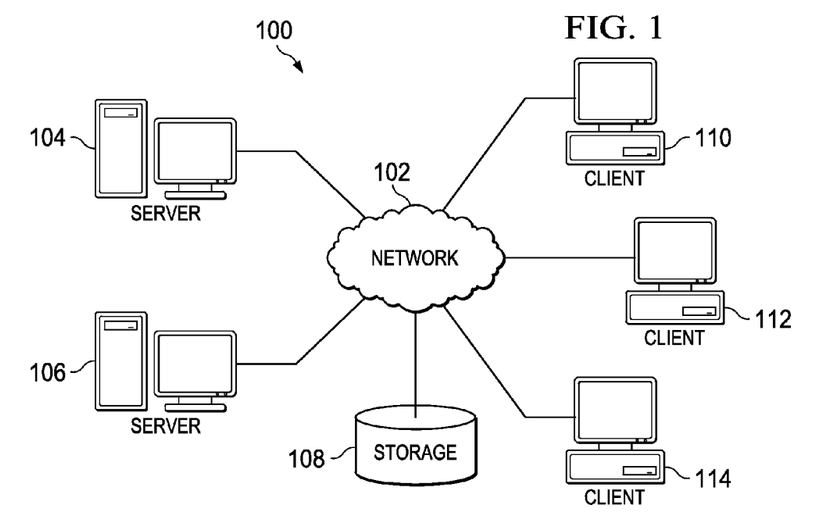
FIG. 1 depicts a pictorial representation of a distributed data processing system in which the illustrative embodiments may be implemented.
Figure 2:
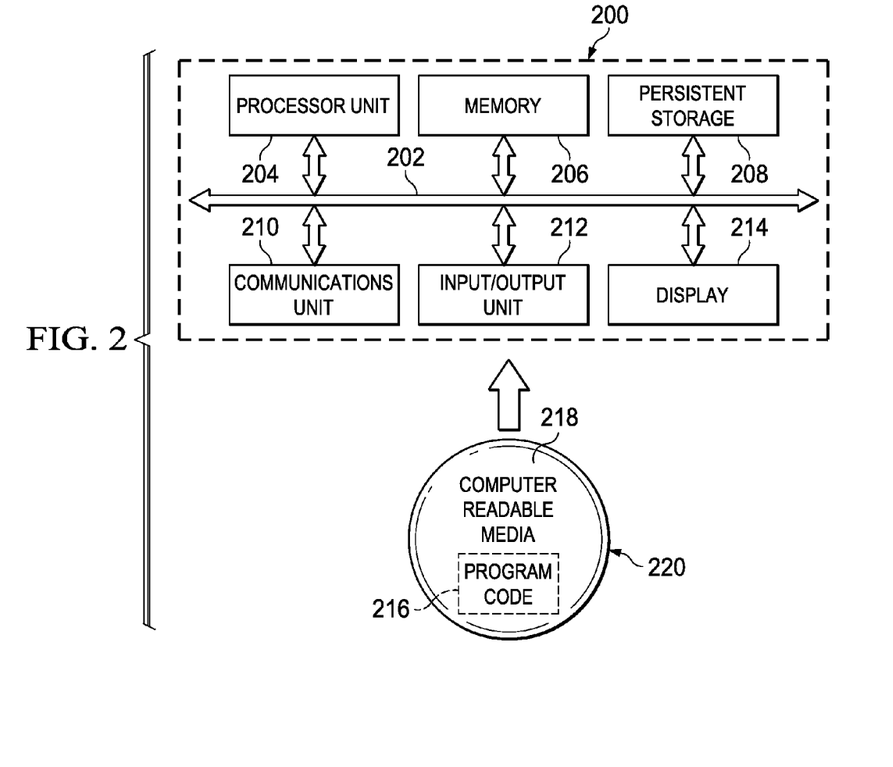
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrative embodiments facilitate sharing of knowledge-based information present in a federated knowledge system, where the knowledge-based information is stored in multiple, disparate data sources. A multilevel knowledge enablement framework is provided which leverages information (or entities) available in multiple, disparate repositories and enhances the information through virtual layers of metadata on top of the existing repositories (knowledge stores).

The illustrative embodiments allow for storing associations among entities in the various levels of a hierarchical knowledge-based structure to represent relationships between the knowledge contained in the federated repositories. These associations are represented by a virtual associations layer which is located on top of the layer representing the base knowledge on demand framework of a repository. The virtual associations layer comprises information (metadata) about an entity (e.g., product or component) and association links to other entities (information, products, or components) related to the entity. This information, or 'association metadata', is stored within a metadata space in a metadata repository. The associations layer also includes provisions to enable entity notifications, based upon a top down or bottom up approach, to finding all instantiations of the objects of the hierarchical information.

The illustrative embodiments also allow for storing and maintaining information about processes and tasks that may span boundaries in a federated knowledge system. This information is represented by a virtual processes layer which is located on top of the association layer. The processes layer is used to collect and facilitate the sharing of information, across boundaries, such as disparate repositories. The processes layer comprises information (metadata) about a task and pointers/links to other related tasks. This task information, or 'process metadata', includes information about the ownership of a task, access and modification timestamps of the task, dependencies on other tasks, etc. The process metadata is stored within the metadata space in a metadata repository.

The process metadata layer allows for capturing process-related data using the linkages in the association layer. Thus, if the process metadata comprises information about a test phase of a software test process, information about the related test phases is discoverable using the association metadata links in the knowledge enablement framework, thereby allowing one to fully understand the methods used in generating information about a process that spans multiple phases and multiple repositories. The information about a software test process obtained by the processes layer may be shared across the various test phases, field support levels, solution deployments, etc., for optimal and efficient execution and improved quality, such as determining the best approach for designing a multi-phase test process in the future.

To facilitate information sharing across disparate repositories, the illustrative embodiments capture and provide access to process-related information (e.g., documents, schedules, etc.) both horizontally and vertically. Process-related information may be shared horizontally among entities at a same level in a knowledge system, or shared vertically (hierarchical relationships) in multiple levels in the knowledge system. In one example, the captured information may comprise the actual tasks performed during a process life cycle (e.g. development, test, product, etc.). This process information is then stored as process metadata within the repository space. Both horizontal metadata associations and multilevel metadata associations are used in such a way that process information may be appended to the metadata associations to provide valuable feedback about process conformity and missteps, necessary corrective process actions, and process bottlenecks. The knowledge systems may be searched periodically for this process-related information and provide instant feedback to the user, thereby allow for the early detection of problems with a process allowing for corrective actions (refinements) to be put in place immediately, or to check for adherence to the given process requirements by team members.

In one exemplary embodiment, the multilevel hierarchical knowledge on demand infrastructure enables one to quickly find institutional knowledge regarding the history support record for a solution. Consider the example of a given customer support engineer who believes that an issue detected in the system is caused by problem A. However, another customer support engineer, possibly having worked years earlier on a similar issue, would analyze the same symptoms and immediately recognize the cause as problem B, not A. This other customer support engineer may no longer be employed with the company. The multilevel hierarchical knowledge infrastructure enables the current customer support engineer to locate this institutional knowledge about the problem using the associations metadata and process metadata and resolve the problem quickly.

Figure 3:
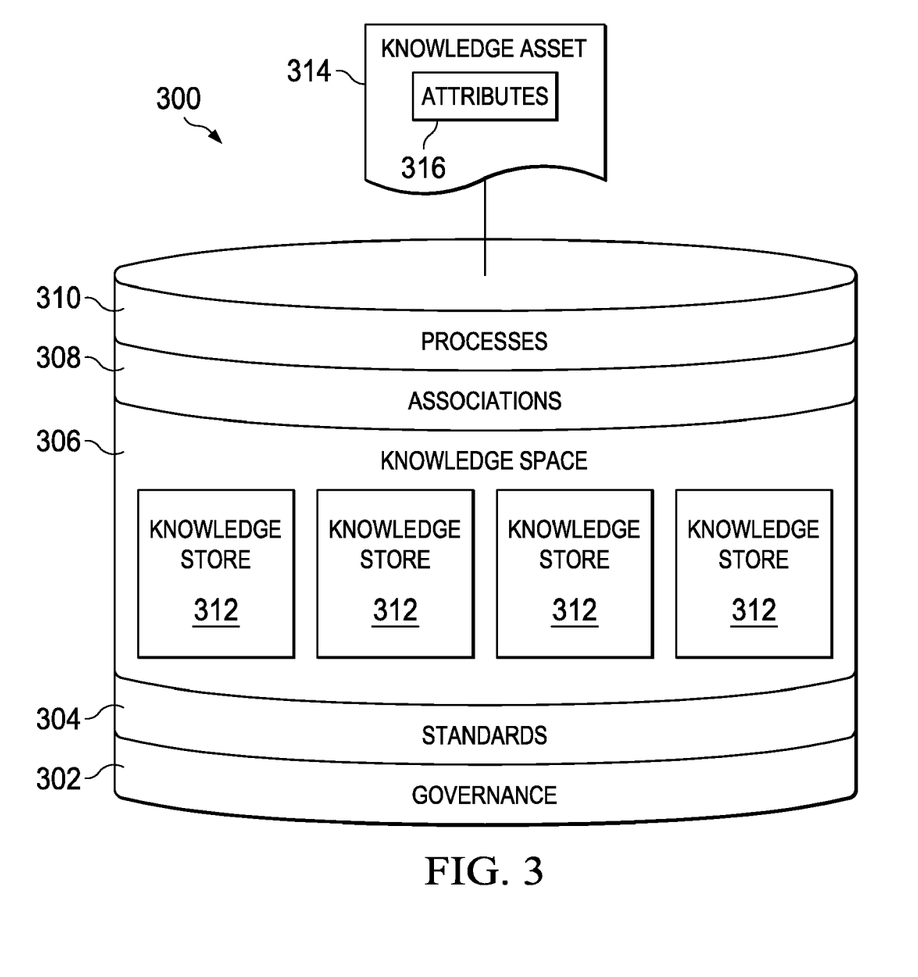
FIG. 3 is a high level graphical illustration of the knowledge enablement framework in accordance with the illustrative embodiments.

FIG. 3 is a high level graphical illustration of the knowledge enablement framework in accordance with the illustrative embodiments. Knowledge enablement framework 300 allows for storing and linking multilevel hierarchical information that may be present in federated repositories worldwide. Knowledge enablement framework 300 includes metadata comprising association links and process data, for information that may be in multiple levels in the hierarchy. In addition, knowledge enablement framework 300 includes provisions to enable entity notifications, based upon a top down or bottom up approach, to find all instantiations of the objects of the hierarchical information.

In this illustrative example, knowledge enablement framework 300 comprises various layers, including governance layer 302, standards layer 304, knowledge space 306, associations layer 308, and processes layer 310. Governance layer 302 is a virtual layer in the framework that represents rules for determining who is allowed access to a repository, as well as how the repository may be accessed. Standards layer 304 is a virtual layer that represents the standards (i.e., common pieces of information) required to access information across the repositories in the framework. Knowledge space 306 represents the multiple repositories in the framework, which may be viewed as one virtual repository. Each cylinder in knowledge space 306 represents an individual repository in the framework. Each individual knowledge store 312 may have its own governance and standards controls. Knowledge asset 314 is an entity or entry in a knowledge store 312, and attributes 316 comprise a description of the entry (e.g., type, size, etc.)

Associations layer 308 is a virtual layer of metadata on top of knowledge space 306 layer. Associations layer 308 represents associations between entities in the repositories in knowledge space 306 which are stored as metadata in knowledge space 306. Using the example of an IT solution, associations layer 308 may comprise relevant information regarding multilevel hierarchical entities (e.g., IT solutions), including linkages to entities composing the entities (e.g., products) as well as to other solutions and entities. Associations layer 308 may further include provisions to enable the discovery and notification of entities included in the hierarchy (all instantiations of this solution in the install base) based upon the federated knowledge base of information and linkages associated with these hierarchies. These provisions may be used in a situation where a bug is found in one of the components, and there is a need to automatically find, notify and potentially upgrade all of the relevant components in the solution that is deployed in environments worldwide. An example basic root data structure for association metadata in associations layer 308 for an entity (solution) in an IT solution is shown below:

| Root Data Structure |
| --- |
| root_name: text<br>root_description: text<br>root_resource_type: examples include solution, SBB, product, service, etc.<br>root_information (pointer to specific information about entity, including program specification, code objectives, etc.)<br>   struct root_resource_association {<br>      root_resource_association type<br>      root_resource_association name: text<br>      root_resource_association description: text<br>      root_resource link (link to other relevant information about root, similar roots, etc. )<br>   } [....] /* could be multiple root resource associations */<br>   root_support_history[...] (links to additional structures about bugs found and associated resolution, bug description, dates found and resolved, etc.; could be multiple links)<br>   struct root_component {/*separate structs for each component, e.g., product, service, etc.*/<br>      ... information about component<br>      component_version_number: text<br>      component_configuration_info[..]: text<br>      component_connection_type[..]: text<br>      component_fixes[...] /* list of applied fixes, including dates, etc. */<br>      component_deployment_links[...] /* links to repositories containing known deployments of components */<br>      association_links[...] /* links to roots, nested hierarchies, etc. */<br>   } [..] |

The associations in the root data structure of the solution comprise pointers to additional information about the solution that is contained in disparate knowledge repositories. Therefore, the data structure includes the name and type of the associations, as well as the actual pointer, or link, to the associated information. The root data structure information for the solution comprises identifying information about the solution itself. The root_resource_associations structure comprises information regarding the root entity's horizontal associations to resources in the federated system, including association_links to other relevant information about the root entity or similar roots. The root_support_history comprises association_links to repositories that contain known fixes applied to the entity. The root_component_information structure comprises information about vertical associations to other entities (products) in the federated system, including version information and fixes for every unit/module in the hierarchy. The root_component_information includes a connect type, which specifies the type of connection between the components composing a solution. The connection type may be a specific type of network connection between two components in a solution. The root_component_information also includes association_links to repositories that contain known deployments of the components. Similar links to the actual solution deployments may also be contained in the root structure.

Another example of a basic data structure for association metadata in associations layer 308 for an entity (solution) in an IT solution is shown below. The data structure may be a root or leaf node. If the structure is a root node, then there is no parent to the structure.

| Association Metadata Data Structure |
| --- |
| name<br>description<br>repository structure [head...tail]<br>entity-access-change-timestamps[head...tail] : history information for metadata |

| Association Metadata Data Structure |
| --- |
| associations[head...tail] : of type metadata pointing to other related metadata<br>type : type of component; solution, product, service etc<br>parent : parent metadata<br>children [head...tail] : child metadata |

| Repository Structure |
| --- |
| name<br>pointer to repository : database url, webpage url etc<br>owner : owner of the repository<br>ACL : access control list<br>Description<br>Type of repository : database, webpage etc<br>entity-access-change-timestamps[head...tail] : history information of repository structure<br>version number : version of the component<br>content-type [ ] : solution support history, component support history, lifecycle phase (development, test, support etc)<br>associations[head...tail] : of type metadata pointing to other related metadata |

The data structure for an entity defines the hierarchy of the repository and the association links pointing to other related metadata. The structure defines the entity type, access and change timestamps comprising history information of the entity, as well as the parent and children of the entity if available. The repository structure comprises information that points to the actual repository where the entity information is located. The repository structure is an entry in the metadata structure.

Processes layer 310 is a virtual layer on top of associations layer 308 which may be used to facilitate the sharing of information, across boundaries, such as among disparate repositories. Processes layer 310 may be used to examine the association links in metadata layer 308 in order to determine the processes and tasks that may span repositories. After the processes layer 310 identifies related processes and tasks using the association metadata in the associations layer 308, processes layer 310 then determines further information about the processes, or 'process metadata'. This 'process metadata' may include information about the owner of the processes, the time the processes were accessed or changed, the process hierarchy, etc. An example of a basic data structure for the process metadata is shown below:

| Process Metadata Data Structure |
| --- |
| process_name: text<br>process_description: text<br>process_owner: text<br>process_type: text<br>process_creation: timestamp<br>process_parent: pointer to parent process structure<br>process_child(ren): array of process structure pointers |

Once the process metadata about processes and tasks that span repositories is determined, this information is stored within knowledge space 306. For example, if the entity is a phase in a software test process, processes layer 310 may examine the association links of the entity/component to determine all of the steps/phases associated with the software test process, and then determine the process metadata about the phases. Thus, processes layer 310 provides an information sharing methodology by which metadata comprising associated linkages in the associations layer 308 form the basis for the sharing of information located in disparate data sources.

Figure 4:
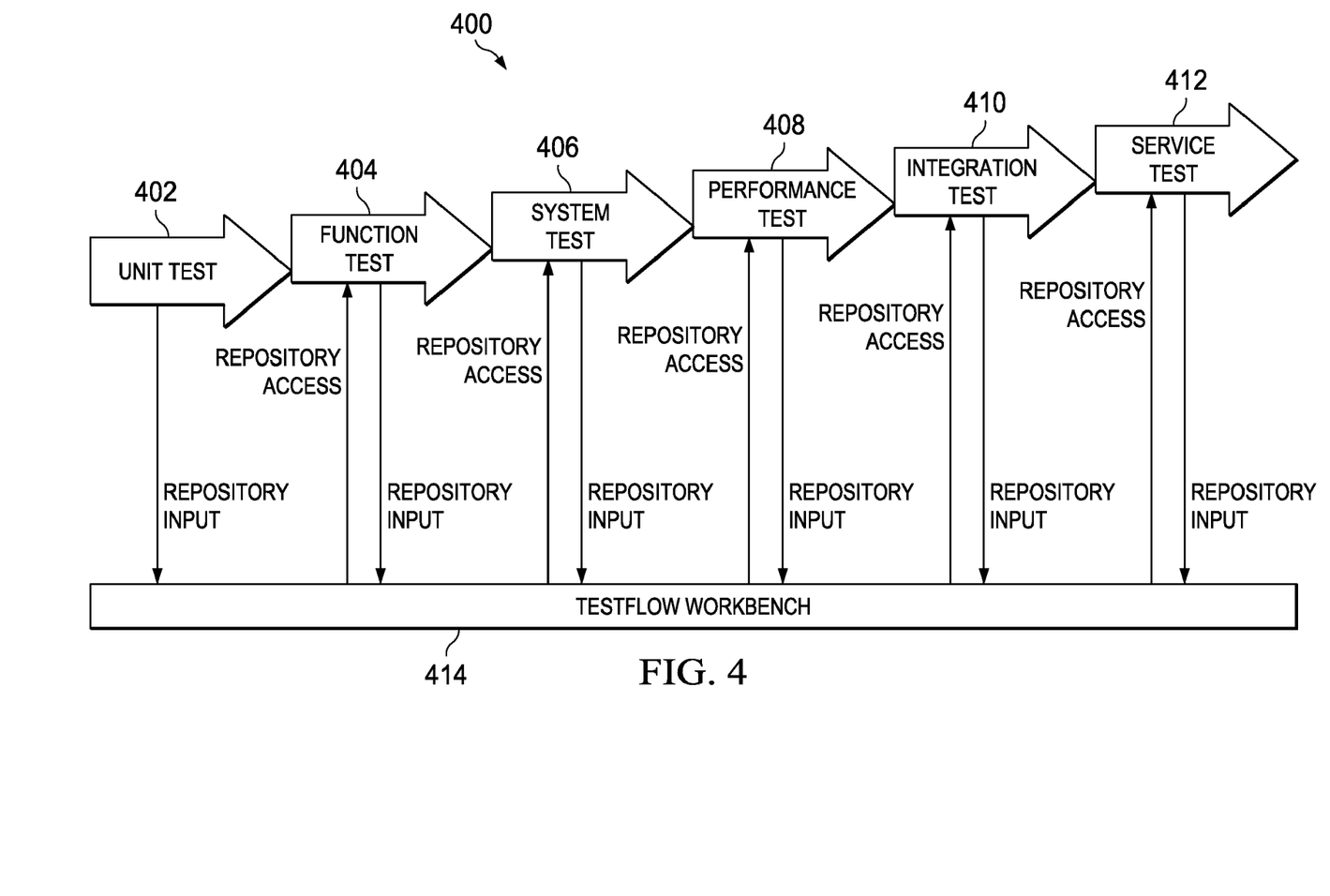
FIG. 4 is a graphical illustration of an example software test process in accordance with the illustrative embodiments.

FIG. 4 is a graphical illustration of an example process in which the knowledge enablement framework of the illustrative embodiments may be used to facilitate the sharing of knowledge-based testing information contained in disparate repositories worldwide using the process metadata. Software test process 400 comprises a test flow in a multi-phased test cycle. Software testing is the process of executing a program or system with the intent of finding errors. Software test process 400 is shown to comprise various phases, including unit test 402, function test 404, system test 406, performance test 408, integration test 410, and service test 412. Each individual phase in the test process accesses information stored in repositories via testflow workbench 414, and outputs testing data to the repositories via testflow workbench 414.

Unit test 402 is the first test in the process. The source code is normally divided into modules, which in turn are divided into smaller units called units. Unit test 402 tests these smallest units of the software to determine if the units are working properly in isolation. Function test 404 verifies that a module performs its intended functions as stated in the specification. System test 406 tests a completely integrated system to verify that the system meets defined requirements. Performance test 408 measures the execution speeds of the integration system and its components to determine if the system is operating as expected. Integration test 410 tests an integrated system to verify that the system is integrated to any external or third party systems defined in the system requirements. Service test 412 tests the product to determine the serviceability of the product in the field. In other words, service test 412 determines how easy or difficult it will be to perform any servicing of the product once the product is in the field.

In existing software testing process methodologies, each phase of the test process is performed in isolation (i.e., in a separate silo). While these existing methodologies provide tools for use in each individual phase of software test process 400, the existing tools are not integrated to provide a complete test solution. In addition, data from each test phase (e.g., system test data) may be known and available only to the system test organization. There is no visibility outside of the system test organization group. If the system test organization is disbanded or reorganized, there is a high probability that the system test data will be lost.

The illustrative embodiments enable the collection of collaborative information on a task(s) for finding and resolving issues in a multi-phased process, such as software test process 400. This information may be the actual data generated during the various stages, as well as information about the process itself. Test flow workbench 414 is accessed and shared during all phases of software test process 400. During unit test 402, function test 404, system test 406, performance test 408, integration test 410, and service test 412, each tester has access to the test flow repository of test data and other pertinent, relevant information for each phase of the test flow via test flow workbench 414. The tester may search the test flow repository for test information.

The knowledge enablement framework provides the foundation for sharing information across the various test phases. Information about a software test may be shared across the product, solution or service life cycle, without the requirement of replicating this information across multiple repositories. The processes (within processes layer 310 in FIG. 3) used to generate this knowledge-based information across the test phases may subsequently be stored within the knowledge space. The knowledge-based information may also be used as a foundation for some analysis of issues. For instance, with a database of known issues and solutions, the knowledge enablement framework allows for providing automated analysis to suggest to the tester, or support employee in the field, the source of a bug (for a product, solution, etc.) and potential resolution. The knowledge enablement framework also allows for providing the tester with contact information for the individual who last encountered this issue. Furthermore, once the issue is found and resolved, the knowledge enablement framework also allows for using multi-level hierarchical associations between entities to find other entities with this issue, and potentially automate the fix to everyone who has deployed this in the field.

The testers in each test phase may input test data into a repository. During each phase of the testflow, a tester may be provided with a menu of options for inputting the relevant test data into the testflow repository. For instance, a menu-driven wizard or web site may be provided to allow a tester to input the test information. The relevant test data may include test cases, test suites, test scripts (all including regression tests), bugs found and associated fixes, other relevant information, and custom, tester-specified options. The relevant test data may also include information about the testflow process, such as the current phase of test flow, the software product under test, and pointers to test data for each phase of testflow. A tester is also provided with the ability to mark when their phase of testflow begins and ends. When a testing phase ends, a message is automatically sent to the relevant test lead of the next phase, as a signal to initiate testing in this next phase of testflow. When the last phase is completed all relevant parties are notified.

One example of a data structure comprising exemplary process metadata that may be used as part of a testflow is shown below:

| Process Metadata Data Structure |
|---|
| entity_name (product, solution, solution building block, etc.) <br> entity_description: text <br> entity_information (pointer to specific information about entity, including program specification, code objectives, etc.) <br> entity_resource_type: examples include report, test phase, test data, test script, test suite, email, webcast, blog, audio, video, service, RSS feed, test coverage, etc. <br>     struct entity_resource_association { <br>         entity_resource_association type <br>         entity_resource_association name: text <br>         entity_resource_association description: text <br>     } [....] /* could be multiple entity resource associations */ <br>     struct entity_process { <br>         entity_phase: phase_type; <br>         entity_phase_enter: timestamp; <br>         entity_phase_exit: timestamp; <br>         entity_phase_owner: text; <br>         entity_phase_outcome: text; <br>     } [MAX_PHASES] <br> entity_resource_link[...] (link to other relevant information about entity, could be multiple links) <br> entity_support_history[...] (links to additional structures about bugs found and association resolution, bug description, dates found and resolved, etc.; could be multiple links) |

The exemplary data structure of process metadata above comprises a foundation for sharing information across the various test phases. For example, the data structure comprises process information for a given entity (e.g., code). The data structure may be used to locate all of the test scripts written for all test phases of the entity. The data structure also specifies the resources associated with the entity, as well as timestamp and owner information about each test phase. The data structure also comprises information about support for this entity.

Figure 5:
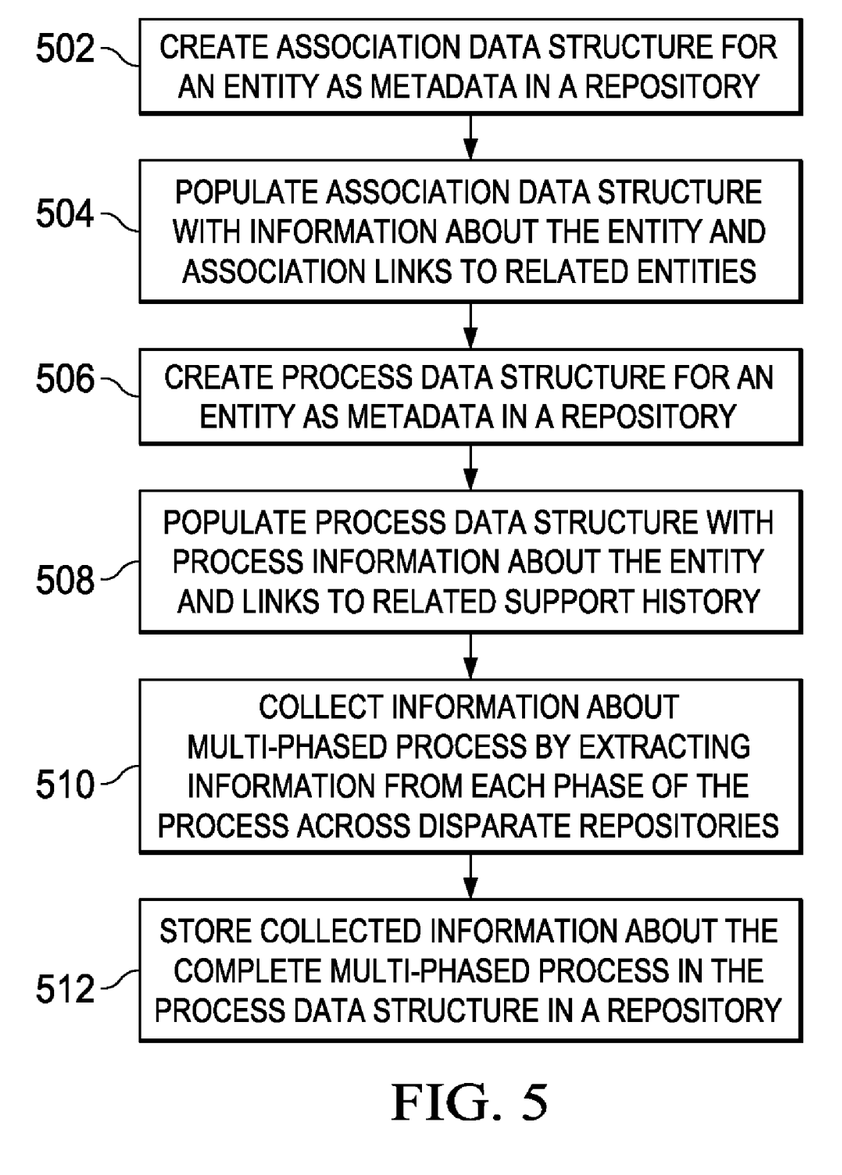
FIG. 5 is a flowchart of a high level process in the multilevel knowledge enablement framework for capturing, accessing, and leveraging federated information in accordance with the illustrative embodiments.

FIG. 5 is a flowchart of a high level process in the multilevel knowledge enablement framework for capturing, accessing, and leveraging federated information in accordance with the illustrative embodiments. The process described in FIG. 5 may be implemented within knowledge enablement framework 300 in FIG. 3.

The process begins with creating an association data structure for an entity as association metadata in a metadata repository space (step 502). This association data structure is then populated with association information about the entity, including association links comprising pointers to specific information about the entity, links to structures comprising support history of the entity, links to fixes applied to other entities that are related to the entity, etc. (step 504). The association data structure may be populated by various means, including, for example, by support, test, or other relevant engineers who populate the structure as part of the support or test process. The engineers may employ tools used as part of the support or test process to extract the information needed to populate the association data structure.

The process also creates a process data structure for the entity as process metadata in the metadata repository space (step 506). The process data structure is then populated with process information about the entity, including defining the ownership of the entity, access and modification timestamps of the entity, parent or children related to the entity in the process hierarchy, etc. (step 508).

The process may then collect information about a multi-phased process (of which a task is a part) by extracting process information from each task or phase of the multi-phased process across the disparate repositories (step 510). Once the process information has been collected from each task in the multi-phased process, the collected information comprising information about the complete multi-phased process may be stored in a single location (the process data structure) in the metadata repository (step 512).

Figure 6A:
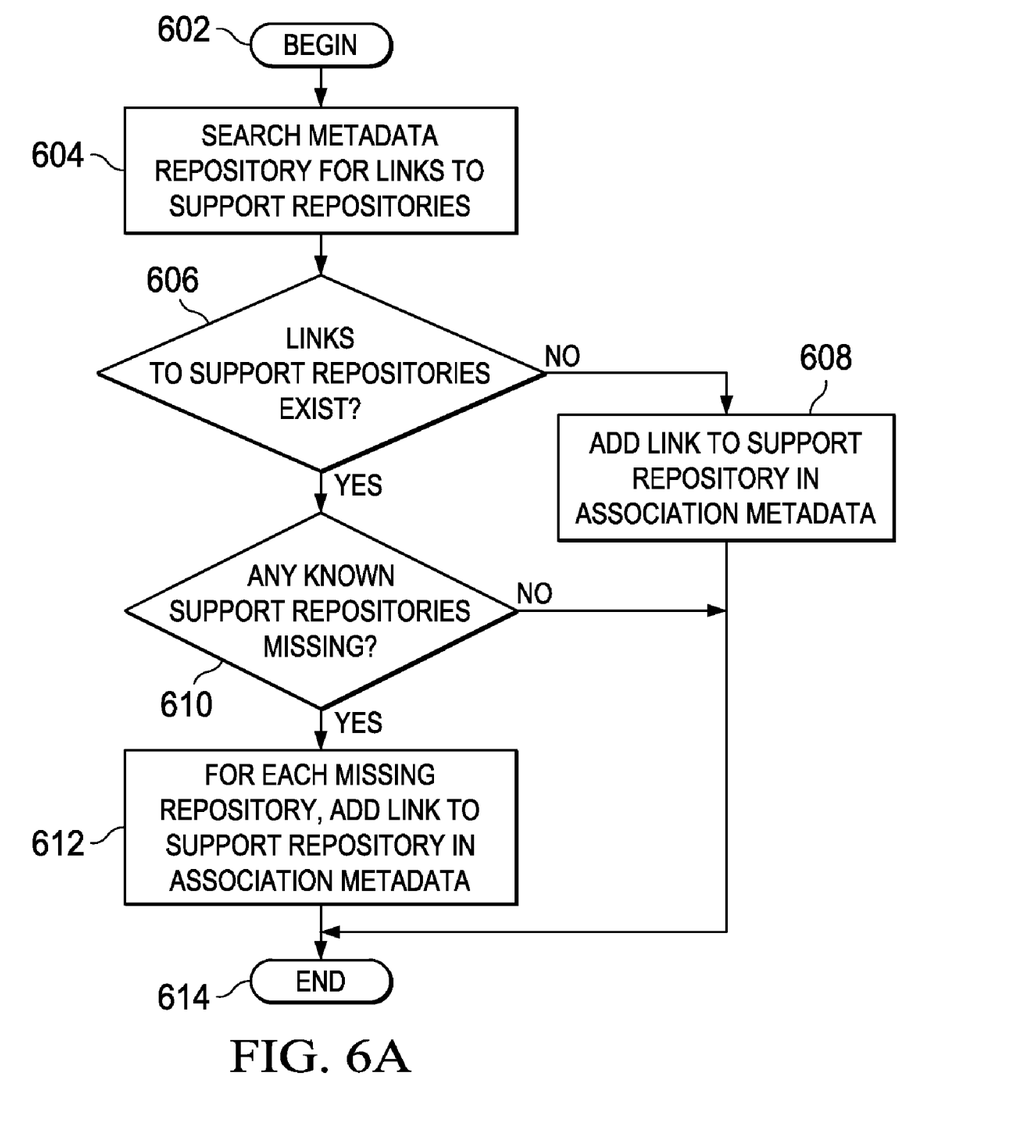
FIGS. 6A and 6B are flowcharts of exemplary processes in the multilevel knowledge enablement framework for populating association information in the metadata in a federated knowledge repository system in accordance with the illustrative embodiments.
Figure 6B:
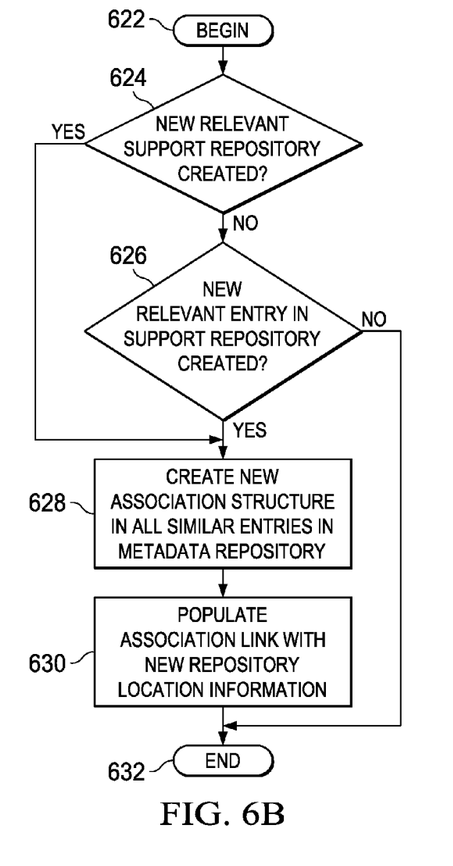

FIGS. 6A and 6B are flowcharts of exemplary processes in the multilevel knowledge enablement framework for populating association information in the metadata in a federated knowledge repository system in accordance with the illustrative embodiments. There are two basic scenarios to consider when populating association information in the metadata. First, a process may be implemented periodically to search the metadata associated with entities to ensure that addresses to known repositories are placed in the relevant association links. Second, when a new repository of information is created, or when a significant amount of new information is included in a repository, the addresses of these repositories are added to the association links of the relevant association structures of metadata representing entities. FIGS. 6A and 6B provide a graphical illustration of these two scenarios for support repositories. However, these processes may be implemented for any repository type; support repositories are just a particular example in this case. The processes described in FIGS. 6A and 6B may be implemented within knowledge enablement framework 300 in FIG. 3 and as step 504 of FIG. 5.

In FIG. 6A, a process is initiated to search the association structures of the metadata repositories to determine if there are association links to relevant association repositories. If there are no association links to relevant association repositories, the association links are added to the association metadata for the known relevant association support repositories. In addition, if association links to any known relevant association repositories are missing from the metadata, then the location of each of these repositories may be added to the association metadata.

The process begins with initiating a process for adding association links to known relevant association repositories in the association metadata (step 602). The process searches the metadata repository for association links to known relevant association repositories (step 604). A determination is then made by the process as to whether the metadata contains links to these known association repositories (step 606). If the metadata does not contain the links to known repositories ('no' output of step 606), the process adds these links to the association metadata (step 608), with the process terminating thereafter (step 614).

Turning back to step 606, if the metadata contains the links to known repositories ('yes' output of step 606), the process makes a determination if there are any known support repositories missing from the metadata (step 610). If no known support repositories are missing from the metadata ('no' output of step 610), the process terminates thereafter (step 614). However, if there are known support repositories missing from the metadata ('yes' output of step 610), the process adds a link to the support repository in the association metadata for each missing repository (step 612), with the process thereafter (step 614).

The process in FIG. 6B assumes that a new support repository is created, or a significant component of an existing repository is created. In such instances, the metadata structures are searched for relevant entities to add association links to this newly created repository, or repository entry. Relevant entries may be specified by the user when creating the new repository. Relevant entries may also be included as keywords stored for each entity in the metadata repository. For example, the process of finding relevant entities in the metadata repository would use the keywords for the newly created repository (as specified by the creator) to search the metadata for similar keywords in each entry.

The process begins with initiating a process for adding association links to known relevant association repositories in the association metadata (step 622). The process then makes a determination as to whether a new relevant association repository has been created (step 624). If a new relevant association repository has been created ('yes' output of step 624), the process creates a new association structure in all entries having similar keywords in the metadata repository (step 628). The process also populates the association link with location information about the newly created association repository (step 630), with the process terminating thereafter (step 632).

Turning back to step 624, if a new relevant association repository has not been created ('no' output of step 624), the process makes a determination as to whether a new relevant entry has been created in the association repository (step 626). If a new relevant entry has not been created ('no' output of step 626), the process terminates thereafter (step 632). However, if a new relevant entry has been created ('yes' output of step 626), the process creates a new association structure in all similar entries in the metadata repository (step 628) and populates the association link with location information about the newly created association repository (step 630), with the process terminating thereafter (step 632).

Figure 7:
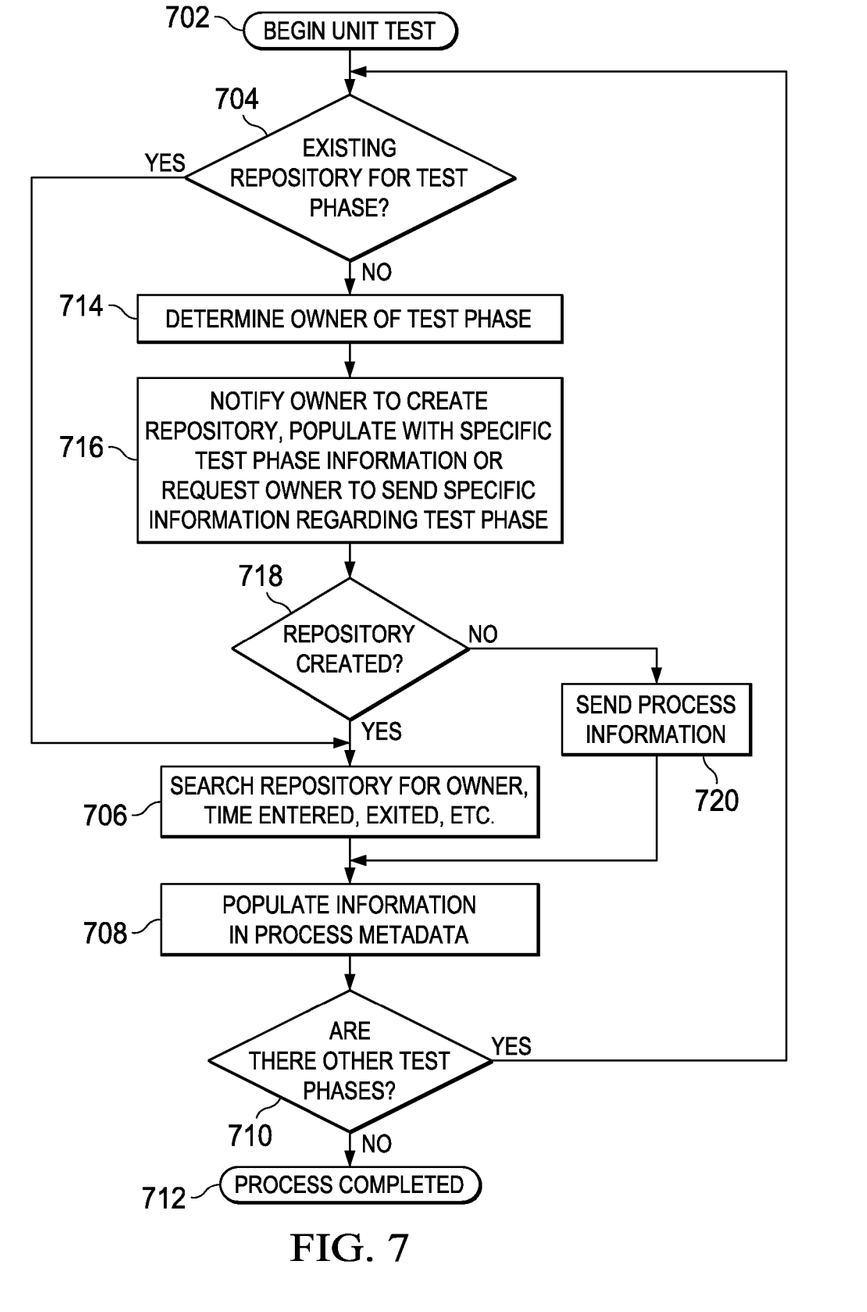
FIG. 7 is a flowchart of an exemplary process in the multilevel knowledge enablement framework for populating processing information in the metadata in a federated knowledge repository system in accordance with the illustrative embodiments.

FIG. 7 is a flowchart of a process in the multilevel knowledge enablement framework for populating processing information in the metadata in a federated knowledge repository system in accordance with the illustrative embodiments. The process described in FIG. 7 may be implemented within knowledge enablement framework 300 in FIG. 3.

The process begins when a task is initiated (step 702). In this example, the task is a unit test (such as unit test 402 in FIG. 4) in one phase of a software test process or testflow. A determination is made as to whether there is an existing repository which already comprises identity information about the test phase (step 704). If there is an existing repository which already comprises identity information about the test phase ('yes' output of step 704), this repository is searched to determine the process information about the test phase (step 706). This process information may include information about the owner of the test phase, the time the test phase was entered, the time the test phase was exited, etc. Once the process information for the task has been obtained, this process information is populated in the repository as process metadata (step 708). A determination is then made as to whether there are any other test phases in the testflow (step 710). In one embodiment, this determination may be made based on the current test phase. For instance, if the testflow is a sequential process, and the current phase is not the last phase in the testflow, then there must be other phases in the testflow to process. In another embodiment, an indicator (e.g., in the repository structure) may be used to indicate that the current phase is not the last phase in the testflow. If there are no other test phases to process ('no' output of step 710), the process is completed (step 712) and terminates thereafter. If there are other test phases in the testflow to process ('yes' output of step 710), the process returns to step 704 to determine if there is an existing repository for the next test phase in the testflow.

Turning back to step 704, if there is not an existing repository which already comprises process information about the test phase ('no' output of step 704), the process determines the owner of the test phase (step 714). The owner may be found in a private repository, in another repository not currently accessible, or in a private conversation. The process then notifies the owner of the test phase to create a repository for the test phase and populate the repository with process information about the test phase or requests that the owner provide the process information about the test phase (step 716). A determination is made as to whether a repository has been created and populated by the owner (step 718). If a repository has been created and populated by the owner ('yes' output of step 718), the process continues to step 706 to search the repository to determine the process information about the test phase. However, if a repository has not been created by the owner ('no' output of step 718), the owner sends the process information (step 720). The process then continues to step 708 in which the process information sent from the owner is populated in the repository in the process metadata.

Figure 8:
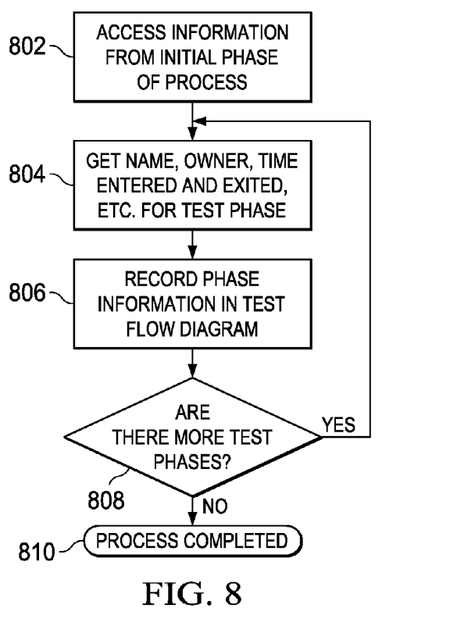
FIG. 8 is a flowchart of an exemplary process in the multilevel knowledge enablement framework for extracting process information from the metadata in a federated knowledge repository system in accordance with the illustrative embodiments.

FIG. 8 is a flowchart of a process in the multilevel knowledge enablement framework for extracting process information from the metadata in a federated knowledge repository system in accordance with the illustrative embodiments. The process described in FIG. 8 may be implemented within knowledge enablement framework 300 in FIG. 3.

The process begins by accessing process information from a first phase of the software test process (step 802). This process information was previously populated in the repository as described by the process in FIG. 7. In this example, the first phase of the test process is a unit test, such as unit test 402 in FIG. 4. The process then collects the process information about the test phase, including the test phase name, owner information, time entered and exited information, etc. (step 804).

The collected process information for the first phase is then stored in one location in the repository (step 806). In this example, the collected process information may be recorded in a test flow diagram. A determination is then made as to whether there are more test phases in the software test process (step 808). If there are no more phases in the test process ('no' output of step 808), the process is completed (step 810), and the process terminates thereafter. However, if there are more phases in the test process ('yes' output of step 808), the process returns to step 804 to collect the process information for the next phase in the software process. Thus, the process information is collected for each phase of the software process, and the collected information for each phase is stored in one location. Consequently, information about each phases of the software test process may be easily gathered and shared across repository boundaries.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters. The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing multi-level hierarchical structured information in disparate knowledge repositories, the computer implemented method comprising:
creating, by a data processing system, an association data structure for a multi-phased software test process as metadata in a metadata repository to form a created association data structure;
populating, by the data processing system, the association data structure with association information of the multi-phased software test process;
creating, by the data processing system, a process data structure in the metadata repository;
collecting, by the data processing system, information from each test phase of the multi-phased software test process across the disparate knowledge repositories using the created association data structure to form collected information, wherein collecting information from each test phrase of the multi-phased software test process comprises:
locating a repository that comprises identity information of a test phase in response to initiation of the test phase;
searching the repository for process information of the test phase; and
extracting the process information of the test phase to form extracted process information, wherein the extracted process information includes access and modification timestamps of the test phase; and
storing, by the data processing system, the extracted process information from each test phase of the multi-phased software test process in the process data structure in the metadata repository, wherein the collected information is searched on a periodic basis to provide process-related information that is used to detect problems with the multi-phased software test process, and wherein corrective actions are taken automatically in response to detected problems.

2. The computer implemented method of claim 1, wherein the association information includes links comprising pointers to fixes applied to other test phases of the multi-phased software test process related to the test phase.

3. The computer implemented method of claim 1, wherein the association data structure is populated by a user.

4. The computer implemented method of claim 1, wherein tools in the multi-phased software test process are used to extract the association information for populating the association data structure.

5. The computer implemented method of claim 1, wherein the process information comprises definitions of an ownership of the test phase, parent or children related to the test phase in a multi-phased software test process hierarchy, and links to related test phase support history of the multi-phased software test process.

6. The computer implemented method of claim 1, wherein each phase in the multi-phased software test process is a unit test phase for testing subunits of software application modules to determine whether each subunit is working properly in isolation, a function test phase for testing each software application module to verify that each software application module is performing its functions as defined in a specification, a system test phase for testing an integrated system to verify that the integrated system meets defined system requirements, a performance test phase for testing the integrated system to measure execution speeds of the integrated system to determine whether the integrated system is operating properly, an integration test phase for testing the integrated system to verify that the integrated system is integrated to external systems as defined in the system requirements, and a service test phase for testing the integrated system to determine serviceability of the integrated system once in field operation.

7. The computer implemented method of claim 1, wherein locating a repository that comprises identity information of the test phase further comprises:
responsive to a determination that no existing repository already comprises identity information of the test phase, sending a request to an owner of the test phase to create a repository for the test phase and populate the repository with the process information of the test phase.

8. The computer implemented method of claim 1, wherein the process information collected about the test phase includes information about an owner of the test phase, time the test phase was entered, and time the test phase was exited.

9. The computer implemented method of claim 1, wherein extracting process information from each test phase of the multi-phased software test process further comprises:
collecting process information from a first test phase of the multi-phased software test process to form collected process information;
storing the collected process information for the first test phase in a location in the metadata repository; and
repeating the collecting and storing steps for each test phase in the multi-phased software test process to store the collected process information at the location.

10. A data processing system for managing multilevel hierarchical structured information in disparate knowledge repositories, the data processing system comprising:
a bus;
a storage device connected to the bus, wherein the storage device contains computer usable code;
at least one managed device connected to the bus;
a communications unit connected to the bus; and
a processing unit connected to the bus, wherein the processing unit executes the computer usable code to create an association data structure for a multi-phased software test process as metadata in a metadata repository to form a created association data structure; populate the association data structure with association information of the multi-phased software test process; create a process data structure in the metadata repository; collect information from each test phase of the multi-phased software test process across the disparate knowledge repositories using the created association data structure to form collected information, wherein collecting information from each test phase in the multi-phased software test process comprises: locating a repository that comprises identity information of a test phase in response to initiation of the test phase, searching the repository for process information of the test phase, and extracting the process information of the test phase to form extracted process information, wherein the extracted process information includes access and modification timestamps of the test phase; and store the extracted process information from each test phase of the multi-phased software test process in the process data structure in the metadata repository, wherein the collected information is searched on a periodic basis to provide process-related information that is used to detect problems with the multi-phased software test process, and wherein corrective actions are taken automatically in response to detected problems.

11. A computer program product for managing multilevel hierarchical structured information in disparate knowledge repositories, the computer program product comprising:
a computer usable medium having computer usable program code tangibly embodied thereon, the computer usable program code comprising:
computer usable program code for creating an association data structure for a multi-phased software test process as metadata in a metadata repository to form a created association data structure;
computer usable program code for populating the association data structure with association information of the multi-phased software test process;
computer usable program code for creating a process data structure in the metadata repository;
computer usable program code for collecting information from each test phase of the multi-phased software test process across the disparate knowledge repositories using the created association data structure to form collected information, wherein the computer usable program code for collecting information from each test phrase of the multi-phased software test process further comprises:
computer usable program code for locating a repository that comprises identity information of a test phase in response to initiation of the test phase;
computer usable program code for searching the repository for process information of the test phase; and
computer usable program code for extracting the process information of the test phase to form extracted process information, wherein the extracted process information includes access and modification timestamps of the test phase; and
computer usable program code for storing the extracted process information from each test phase of the multi-phased software test process in the process data structure in the metadata repository, wherein the collected information is searched on a periodic basis to provide process-related information that is used to detect problems with the multi-phased software test process, and wherein corrective actions are taken automatically in response to detected problems.

12. The computer program product of claim 11, wherein the association information includes links comprising pointers to fixes applied to other test phases of the multi-phased software test process related to the test phase.

13. The computer program product of claim 11, wherein tools in the multi-phased software test process are used to extract the association information for populating the association data structure.

14. The computer program product of claim 11, wherein the process information comprises definitions of an ownership of the test phase, parent or children related to the test phase in a multi-phased software test process hierarchy, and links to related test phase support history of the multi-phased software test process.

15. The computer program product of claim 11, wherein each phase in the multi-phased software test process is a unit test phase for testing subunits of software application modules to determine whether each subunit is working properly in isolation, a function test phase for testing each software application module to verify that each software application module is performing its functions as defined in a specification, a system test phase for testing an integrated system to verify that the integrated system meets defined system requirements, a performance test phase for testing the integrated system to measure execution speeds of the integrated system to determine whether the integrated system is operating properly, an integration test phase for testing the integrated system to verify that the integrated system is integrated to external systems as defined in the system requirements, and a service test phase for testing the integrated system to determine serviceability of the integrated system once in field operation.

16. The computer program product of claim 11, wherein the computer usable program code for locating a repository that comprises identity information of the test phase further comprises:

computer usable program code for sending, in response to a determination that no existing repository already comprises identity information of the test phase, a request to an owner of the test phase to create a repository for the test phase and populate the repository with the process information of the test phase.

17. The computer program product of claim 11, wherein the process information collected about the test phase includes information about an owner of the test phase, time the test phase was entered, and time the test phase was exited.

18. The computer program product of claim 11, wherein the computer usable program code for extracting process information from each test phase of the multi-phased software test process further comprises:

computer usable program code for collecting process information from a first test phase of the multi-phased software test process to form collected process information;

computer usable program code for storing the collected process information for the first test phase in a location in the metadata repository; and     computer usable program code for repeating the collecting and storing steps for each test phase in the multi-phased software test process to store the collected process information at the location.

\* \* \* \* \*